July 28, 1931. B. W. BREWSTER 1,816,310
BRAKE CONSTRUCTION FOR DRAW WORKS
Filed March 20, 1929
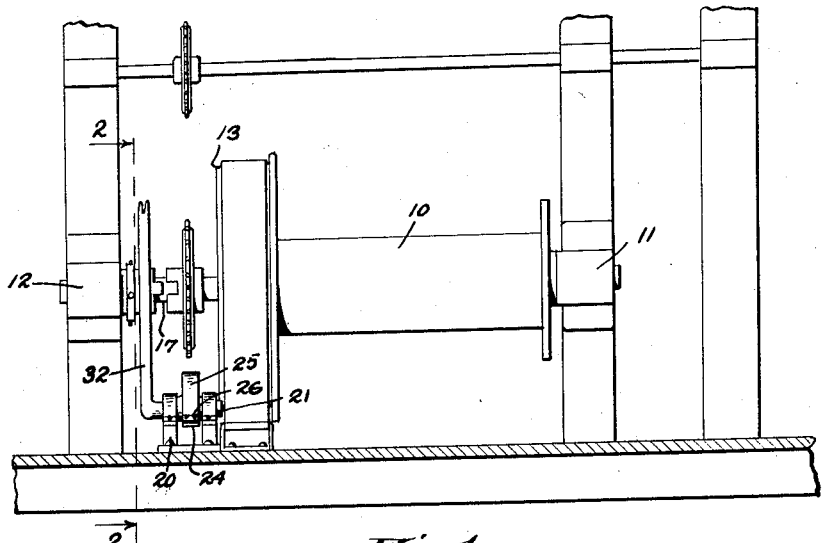
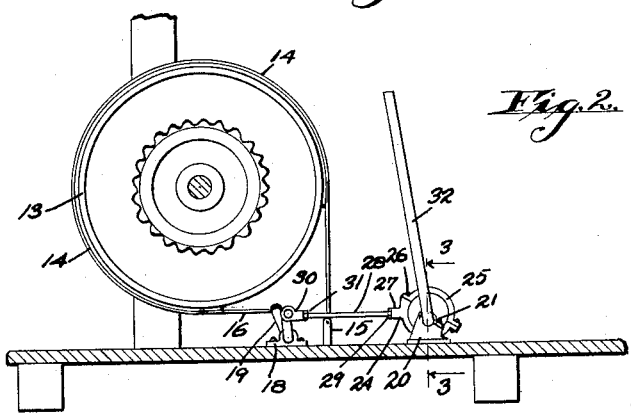
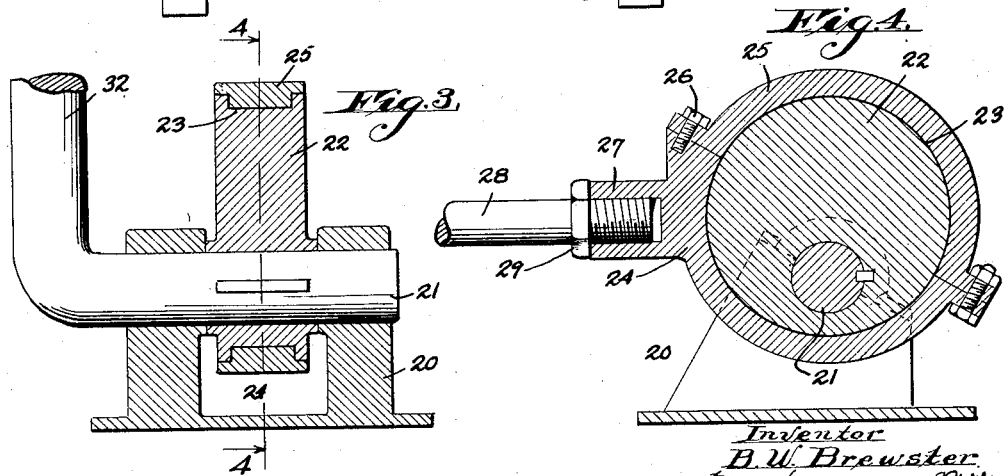
Inventor
B. W. Brewster
by Hazard and Miller
Attorneys Patented July 28, 1931

1,816,310

UNITED STATES PATENT OFFICE

BRYAN W. BREWSTER, OF FULLERTON, CALIFORNIA

BRAKE CONSTRUCTION FOR DRAW WORKS

Application filed March 20, 1929. Serial No. 348,627.

This invention relates to a brake construction for the draw works employed in a well drilling apparatus.

In a well drilling apparatus there is a hoisting mechanism commonly referred to as the draw works which has a cable drum on which cable is adapted to be wound on elevating parts such as drill pipe in the derrick. This cable drum is controlled by a brake comprising a brake drum fastened to the cable drum and a brake band encircling the brake drum. In the usual construction one end of the brake band is stationarily fastened to the derrick floor and the other end of the brake band is adapted to be tightened and loosened by a brake lever. A clutch serves to connect the cable drum to a suitable power source and in using the device it is frequently necessary to hold the brake on until the clutch engages. The construction is such, however, that as soon as the clutch engages it starts the rotation of the brake drum which has a tendency of pulling on the movable end of the brake band with a considerable force, tending to loosen the brake. The operator is caused to hold the brake lever to keep the cable drum stationary until the clutch engages after which he can, of course, release the brake lever. It frequently occurs, however, that the operator cannot release the brake lever at the very instant the clutch engages, resulting in the brake lever being thrown forcibly and injuring the operator.

It is an object of the invention to provide an improved brake construction which is so constructed that the brake operating lever cannot get out of control of the operator nor be thrown with such a force as to injure him in the event that he fails to release it at the very instant the clutch engages.

It is another object of the invention to provide an improved brake construction for a draw works or the like which is of novel, simple and durable construction and which provides for easy application of the brake without danger of the drum getting out of the operator's control.

With the foregoing and other objects in view which will be made manifest in the following detailed description and specifically pointed out in the appended claims, reference is had to the accompanying drawings for an illustrative embodiment of the invention.

Fig. 1 is a partial view in front elevation illustrating a draw works to which the invention is shown as having been applied.

Fig. 2 is a view taken substantially upon the line 2—2 upon Fig. 1 in the direction indicated.

Fig. 3 is a partial view in vertical section taken substantially upon the line 3—3 upon Fig. 2.

Fig. 4 is a vertical section taken substantially upon the line 4—4 upon Fig. 3 in the direction indicated.

Referring to the accompanying drawings wherein similar reference characters designate similar parts throughout, the draw works is illustrated as having a cable drum 10 rotatably mounted between bearings 11 and 12. The cable drum has associated with it a brake drum 13 which is encircled by a brake band 14, one end of which is stationarily fastened as at 15 and the other end indicated at 16 being movable to tighten and loosen the brake. The cable drum is adapted to be rotated by a suitable source of power through a clutch indicated at 17. Near the movable end 16 of the brake band 14 there is positioned a bearing 18 on the derrick floor in which a crank 19 is rotatable. One arm of the crank is fastened to the movable end 16 of the brake band. In prior conventional constructions the other arm of the crank 19 is extended upwardly and constitutes a brake lever which on being swung forwardly will cause tension to be exerted on the movable end 16 thus contracting the band 14 about the brake drum. In the improved construction, however, the mentioned other arm of the crank 19 is left relatively short as clearly shown on Fig. 2. The improved construction comprises a bearing 20 mounted on the derrick floor forwardly of the bearing 18. This bearing serves to rotatably support a rock shaft 21 to which is keyed or otherwise secured an eccentric 22 having a groove 23 formed on its periphery. A strap for the eccentric is provided which may be made in any suitable manner and which is shown as having a base or body part 24 and a cap 25 fastened to the body as by bolts 26. On the base or body part 24 there is formed a tubular extension 27 which is internally threaded to receive the threaded end of a connecting rod 28. The connecting rod may be adjusted and is held in any adjusted position by means of a jam nut 29. On the opposite end of the connecting rod there is provided a clevis 30 which is internally threaded at one end to receive the threaded end of the connecting rod and which is held in adjusted position by a jam nut 31. The clevis 30 is pivotally connected to the free or outer end of the crank 19. As clearly shown on Fig. 3 the strap of the eccentric is provided with an internal annular rib or shoulder 32 fitting in the groove 23 to prevent lateral movement of the strap with respect to the eccentric. The end of the rock shaft 21 is bent upwardly as indicated at 32 to provide a brake lever.

The operation of the improved brake is as follows: By swinging the brake lever 32 forwardly the eccentric 22 will be rotated causing a tension to be exerted on the connecting rod 28 rotating the crank 19 and thus causing the brake band 14 to be contracted about the brake drum 13. Reverse movement of the brake lever causes the brake band 14 to loosen.

It will be found that in using the improved construction that the brake lever 32 will not be swung rearwardly with a great degree of force when the clutch 17 is moved into engagement so that there is no danger of having the brake get out of control of the operator or of having the brake lever 32 injure the operator. When the eccentric is rotated the strap moves downwardly so that the longitudinal axis of the connecting rod 28 approaches the fulcrum formed by the rock shaft 21. Consequently when the brake is on the tightest and the greatest tensional stresses are exerted in the connecting rod 28 after throwing the clutch into engagement with the consequence of the brake drum 13 tending to loosen the band 14 these stresses will be transmitted directly to the fulcrum without tending to reversely swing the brake lever 32 to any marked extent. Consequently, when the clutch 17 is thrown into engagement the forces exerted by the brake band will be transmitted directly to the rock shaft 21 without being transmitted to the operator's hand through the brake lever 32 to any marked degree. Consequently, the improved construction enables the operator to keep a good control of the brake at all times without danger of the brake lever being thrown reversely with such force as might injure him.

It will be appreciated that the above described construction is simple and durable and has many advantages over the constructions heretofore employed.

Not only does the improved brake construction enable the operator to control the brake without danger of injury but it also enables the brake to be applied with an exceptional degree of force. The construction of the eccentric is such that the mechanical advantage present is quite high so that the operator does not have to exert his maximum strength to apply the brake and hold it in applied position. This feature of being able to apply the brake very easily will be distinctly appreciated by those familiar with the art.

Various changes may be made in the details of construction without departing from the spirit or scope of the invention as defined by the appended claims.

I claim:

1. A brake construction for draw works and the like comprising a brake drum, a band for the drum, one end of which is stationarily fastened and the other end of which is movable so as to tighten and loosen the band, a crank connected to the movable end of the band, an eccentric rotatably mounted, a strap for the eccentric, means for rotating the eccentric and means connecting the strap to the crank.

2. A device for tightening and loosening brake bands on the brake drums of draw works and the like comprising an eccentric rotatably mounted, a strap for the eccentric, means for rotating the eccentric, and means operably connecting the strap to the brake band, there being an annular rib formed on the strap receivable in a groove on the eccentric preventing lateral movement of the strap with respect to the eccentric.

In testimony whereof I have signed my name to this specification.

BRYAN W. BREWSTER.